United States Patent [19]

Kabayama

[11] Patent Number: 4,724,112

[45] Date of Patent: Feb. 9, 1988

[54] FASTENING METHOD OF FRICTION FACING FOR CLUTCH DISC ASSEMBLY

[75] Inventor: Yoshiaki Kabayama, Hirakata, Japan

[73] Assignee: Kabushiki Kaisha Daikin Seisakusho, Osaka, Japan

[21] Appl. No.: 941,115

[22] Filed: Dec. 12, 1986

[30] Foreign Application Priority Data

Dec. 13, 1985 [JP] Japan .................................. 60-281701

[51] Int. Cl.⁴ .............................................. B29C 43/00
[52] U.S. Cl. ..................................... 264/275; 264/278
[58] Field of Search ..................... 264/112, 29.4, 275, 264/278, 273

[56] References Cited

U.S. PATENT DOCUMENTS 3,998,573  12/1976  Gilbert et al. ........................ 264/112
4,291,794   9/1981  Bauer ................................... 264/29.4

Primary Examiner—Frank Sever
Attorney, Agent, or Firm—Armstrong, Nikaido, Marmelstein & Kubovcik

[57] ABSTRACT

A fastening method of friction facing for clutch disc assembly, wherein projections which are able to directly hold a cushioning plate in a sandwich manner, are formed on a mold for forming friction facings, the friction facings are formed into desired shapes within said mold and said friction facings are always fastened to said cushioning plate correctly by providing a correct holding position of said cushioning plate by means of the mold while heating and pressing said mold.

5 Claims, 5 Drawing Figures

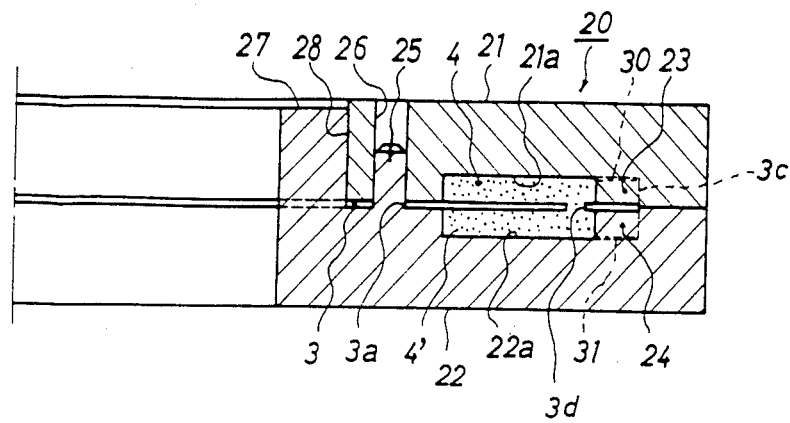
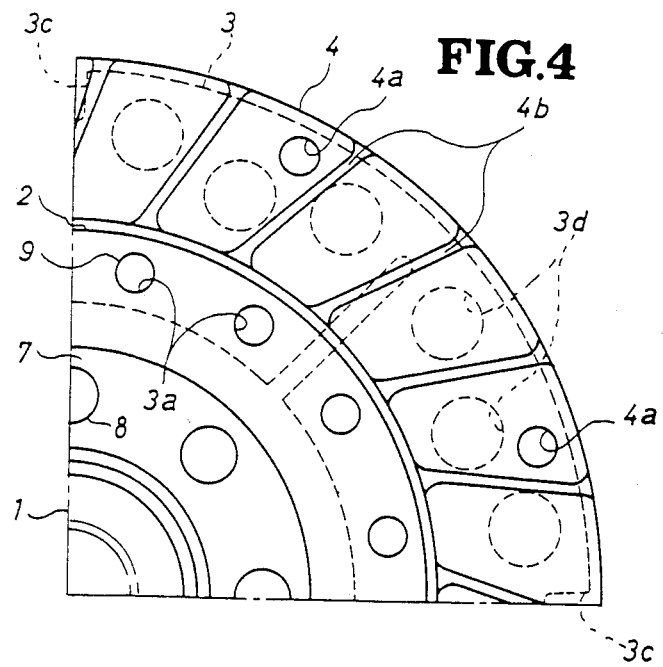

4,724,112

FASTENING METHOD OF FRICTION FACING FOR CLUTCH DISC ASSEMBLY

BACKGROUND OF THE INVENTION 1. (Industrial useful field)

This invention relates to a fastening method of friction facing for clutch disc assembly suitable mainly for a dry automobile clutch.

2. (Prior art)

A conventional clutch disc assembly generally has a construction as illustrated in FIG. 5. Namely, in FIG. 5, 1 is a spline hub, 2 is a clutch plate, 3 is a cushioning plate, and 4 and 4' are friction facings. The spline hub 1 spline fits in a main drive shaft (having a center axis 5) forming an input shaft of a transmission, and integrally has a hub flange 7. The clutch plate 2 is fastened to this hub flange 7 by means of a rivet 8, the cushioning plate 3 is rigidly fixed to an outer peripheral part of the clutch plate 2 by means of a rivet 9, and the facings 4 and 4' are fastened to this cushioning plate 3 by means of a facing rivet 10.

An engine torque is generally transmitted from a flywheel (not shown) through a pressure plate (not shown), the friction facings 4 and 4', the clutch plate 2 and the spline hub 1 to the main drive shaft 5.

3. (Problem of the prior art)

In the above conventional construction wherein the facing rivet 10 is used for fastening the friction facings 4 and 4' to the cushioning plate 3, there was a problem that effective wear clearances of the friction facings 4 and 4' was considerably decreased due to the facing rivet to be installed. Therefore, even in the conventional embodiment, such a method was employed that the friction rivet 10 was disused and the friction facings 4 and 4' were heated and vulcanized by using a heating press system to unite the friction facing 4 with the friction facing 4' and at the same time to fasten the friction facings 4 and 4' to the cushioning plate 3 for the purpose of increasing the effective wear clearance of the friction facings 4 and 4'.

In the above system for fastening the friction facings 4 and 4', however, the friction facings 4 and 4' temporarily formed on the both sides of the cushioning plate 3 were fludic, and moreover such a problem was subject to be encountered that weight compositions of the friction facings 4 and 4' were apt to disperse so that thicknesses of the friction facing 4 and the friction facing 4' formed on both sides of the cushioning plate 3 were hard to made equal and a large difference was produced between the effective wear clearance of the friction plate 4 and that of the friction facing 4' on both sides of the cushioning plate 3.

4. (Object of the invention)

An object of this invention is to solve the above problem of the conventional embodiment. In order to accomplish the above object of this invention; in a fastening method of friction facing for clutch disc assembly wherein a clutch plate is fixed to a spline hub and friction facings are fastened to an outer peripheral part of said clutch plate through a cushioning plate; projections which are able to directly hold said cushioning plate in a sandwiching manner, are formed on a mold for forming said friction facings, the friction facings are formed into desired shapes within said mold and said friction facings are always fastened to said cushioning plate correctly by providing a correct holding position of said cushioning plate by means of the mold while heating and pressing said mold.

BRIEF DESCRIPTION OF THE DRAWINGS

FIG. 3 is a sectional view taken on a line III—III of FIG. 2 showing a state where friction facings are filled in a mold during manufacturing process.

FIG. 4 is a partially omitted elevation view showing a clutch disc assembly according to another embodiment.

DETAILED DESCRIPTION OF THE INVENTION (Embodiment 1)

Figure 1:
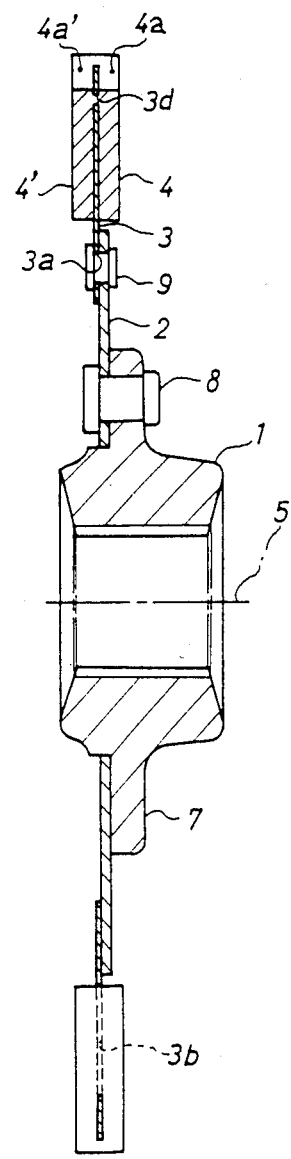
FIG. 1 is a vertical sectional side view of a clutch disc assembly manufactured by a method according to this invention.
Figure 2:
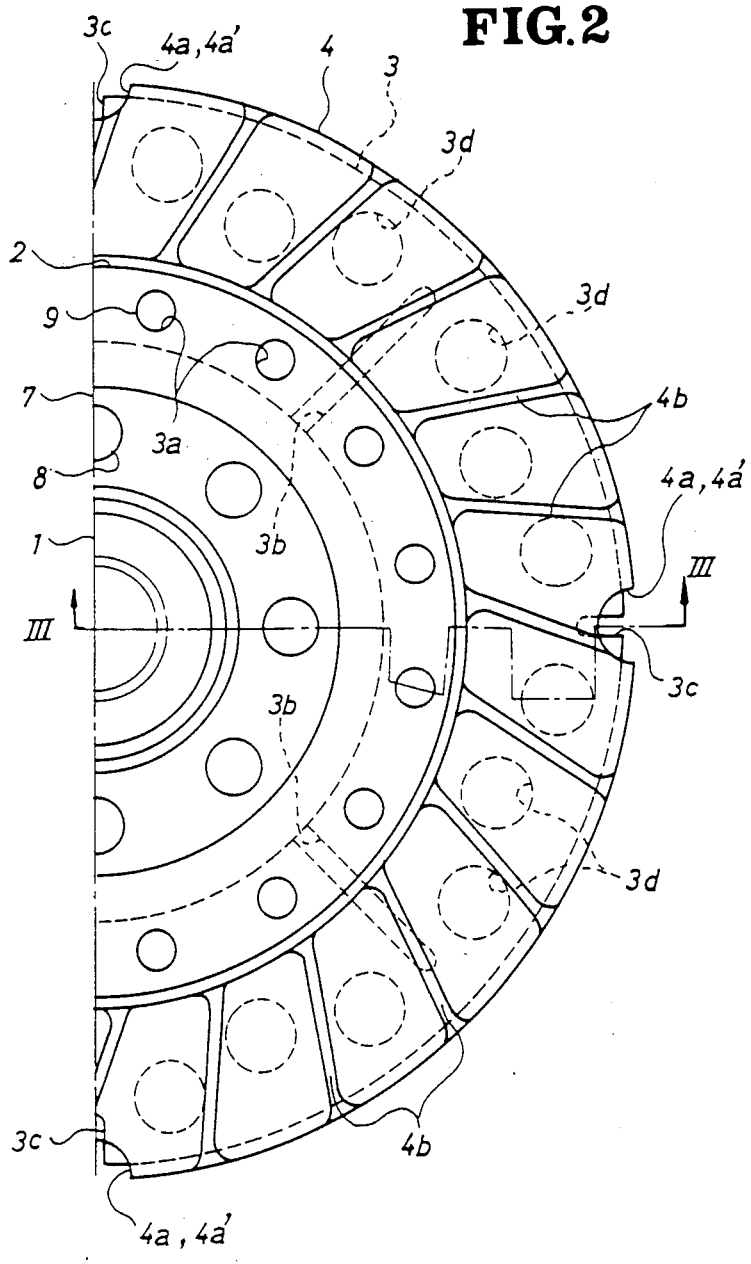
FIG. 2 is a partially omitted elevation view.
Figure 5:
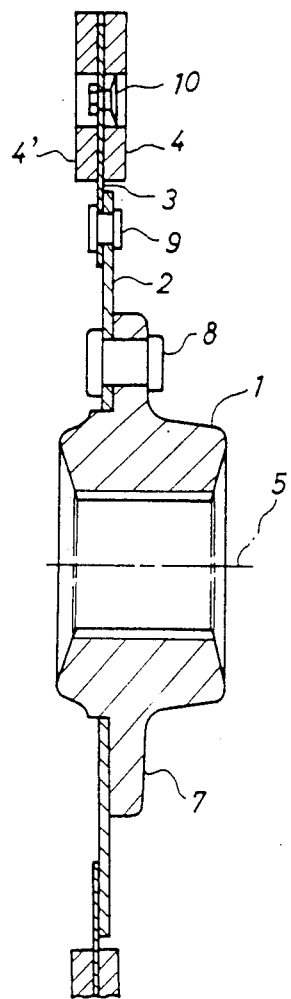
FIG. 5 is a partially omitted vertical sectional side view of a clutch disc assembly manufactured by a conventional method.

FIG. 1 and FIG. 2 show the clutch disc assembly manufactured by the method according to this embodiment, symbols same with those of FIG. 5 represent corresponding components so that descriptions of components having been explained in the prior art will be omitted hereunder.

Passing holes 3a for passing the rivet 9 are made on the cushioning plate 3 and at the same time notched slits 3b are formed at specified intervals from an inner peripheral face, and notched slits 3c are formed from an outer peripheral face at intermediate positions between the notched slits 3b. These notched slits 3b and 3c are for furnishing the cushioning plate 3 with an elasticity, and the notched slits 3d are connecting holes for integrally uniting the friction facing 4 and the friction facing 4'. Plural grooves 4b and 4b' extending approximately in radial direction are formed on external side faces of the friction facings 4 and 4', and recessed portions 4a and 4a' exposing the cushioning plate 3 are formed at intervals of 90 degrees on its outer peripheral part.

FIG. 3 is the sectional view showing a state when heating and pressing the friction facings 4 and 4', and the mold 20 is composed of an approximately ring-shaped upper mold 21 and a lower mold 22. A ring-shaped recessed portion 21a for incorporating the temporarily formed friction facing 4 is formed on the upper mold 21, and projections 23 which are able to directly hold outer peripheral parts of the cushioning plate 3 at intervals of 90 degrees, are formed at specified positions of an outer peripheral part of the ring-shaped recessed portion 21a. The recessed portions 4a of the friction facing 4 are formed by these projections 23. Further, 26 is a fitting hole for receiving a fitting projection 25 of the lower mold 22.

On the other hand, projections 24 corresponding to the projections 23 are formed on the lower mold 22, recessed portions 4a' of the friction facing 4' are formed by these projections 24, and a ring-shaped recessed portion 22a corresponding to the ring-shaped recessed portion 21a is also formed in the same manner. 25 pierces the passing hole 3a of the cushioning plate 3, fits in the fitting hole 26, and forms a fitting projection for positioning in relation to the mold 20 of the cushioning plate 3. 27 is a positioning projection for supporting an inner peripheral part of the cushioning plate 3 and further supporting an inner peripheral surface 28 of the upper mold 21. 30 and 31 are groove forming projected strips for forming the grooves 4b and 4b'.

In order to fasten the friction facings 4 and 4' to the cushioning plate 3 by the use of the mold 20 having such construction; the friction facing 4' which has been temporarily formed with asbestos or carbon fiber etc. used as its material, is filled in the ring-shaped recessed portion 22a of the lower mold 22, in the first stage; and the passing hole 3a is fitted onto the fitting projection 25 to position and install the cushioning plate 3 in relation to the lower mold 22, in the second stage. Then, the temporarily formed friction facing 4 is placed on the cushioning plate 3, and the upper mold 21 is placed thereon so that the fitting hole 23 is fitted onto the fitting projection 25 and the projection 23 is mated with the projection 24 to hold an outer peripheral part of the cushioning plate 3.

Then, the mold 20 is heated and pressed so that the temporarily formed friction facings 4 and 4' are cured into the shapes of the ring-shaped recessed portions 21a and 22a. The friction facings 4 and 4' are heated and vulcanized by this heated pressing to be united through the connecting hole 3d, and at the same time the friction facings 4 and 4' are fastened to the cushioning plate 3. Further, the friction facings 4 and 4' forced out of the ring-shaped recessed portions 21a and 22a due to the pressing partly enter the notched slits 3b and 3c to further strengthen the unification of the friction facings 4 and 4'.

Incidentally, it is also possible to use a bonding agent in order to furthermore strengthen the fastening of the friction facings 4 and 4' to the cushioning plate 3.

In case when the friction facings 4 and 4' are fastened to the cushioning plate 3 by means of the above-mentioned method, the cushioning plate 3 is directly held by the projections 23 and 24 so that the cushioning plate 3 can be correctly positioned relatively to the mold 20 and the friction facings 4 and 4' of the same thickness can also be formed on the both sides of the cushioning plate 3. In other words, the cushioning plate 3 is positioned exactly at centers of the friction facings 4 and 4'.

In another embodiment as shown by FIG. 4, the projections 23 and 24 are not constructed as to contact with the outer peripheral part of the cushioning plate 3. They are formed at positions where they contact with radial midways of external faces of the cushioning plate 3 so that the recessed portions 4a and 4a' resulted from the projections 23 and 24 are formed on the radial midways of external faces thereof. There is no limitation to forming positions of the projections 23 and 24, but they may be positioned anywhere only if they can directly hold the cushioning plate 3.

(Effect of the invention)

In this invention, the projections 23 and 24 which are able to directly hold the cushioning plate 3 are formed on the mold 20 for forming the friction facings 4 and 4', so that the cushioning plate 3 can be held at its correct position by the mold 20. While, the friction facings 4 and 4' can be formed into desired shapes within the mold 20 and at the same time said friction facings 4 and 4' can always be fastened to the cushioning plate 3 correctly by heating and pressing the mold 20. Therefore, when the friction facings 4 and 4' are fastened to the cushioning plate 3, the cushioning plate 3 is directly held by the projections 23 and 24 so that the cushioning plate 3 does not deviate relatively to the mold 20. Consequently, since the friction facings 4 and 4' of the same thickness are always formed on both sides of the cushioning plate 3, the problem that a large difference is produced between the effective wear clearances of the friction facing 4 and the friction facing 4' can be solved. Accordingly, such a trouble can be avoided that the cushioning plate 3 becomes exposed during operation in an earlier stage.

What is claimed is:

1. A fastening method of friction facing for clutch disc assembly, in which a clutch plate is fixed to a spline hub and friction facings are fastened to outer peripheral parts of said clutch plate through a cushioning plate; comprising: providing friction facings of substantially equal thickness on both sides of said clutch plate by, forming projections which are able to directly hold said cushioning plate in a sandwiching manner, on a mold for forming said friction facings, forming said friction facings into desired shapes within said mold and enabling said said friction facings to always be fastened to said cushioning plate correctly by providing a correct holding position of said cushioning plate by means of the mold while heating and pressing said mold.

2. A fastening method of friction facing for clutch disc assembly as set forth in claim 1, in which said projections are positioned at outer peripheral parts of said friction facings.

3. A fastening method of friction facing for clutch disc assembly as set forth in claim 1, in which said projection are positioned at radial midways of external side faces of said friction facings.

4. A fastening method of friction facing as set forth in any one of claim 1, claim 2 or claim 3; in which said projections are disposed at 4 places with equal distances left therebetween in a circumferential direction.

5. A fastening method of friction facing as set forth in any one of claim 1, claim 2, or claim 3; in which fitting positioning projections which pierce the cushioning plate are formed on one of a pair of molds, positioning holes which fit onto said fitting positioning projections are made on the other mold, and circumferential positions of the cushioning plate and the other mold are aligned to that of the other mold by fitting said fitting positioning projections in said positioning holes.

* * * * *